Nov. 28, 1961  R. D. FORSBERG  3,010,667
APPARATUS FOR WINDING TAPPED COILS
Filed March 24, 1958

INVENTOR.
ROBERT D. FORSBERG
BY
Joseph Weingarten
ATTORNEY

United States Patent Office 3,010,667
Patented Nov. 28, 1961

3,010,667
APPARATUS FOR WINDING TAPPED COILS
Robert D. Forsberg, Cambridge, Mass., assignor to Computer Control Company, Inc., Wellesley, Mass., a corporation of Massachusetts
Filed Mar. 24, 1958, Ser. No. 723,248
7 Claims. (Cl. 242—9)

The present invention relates in general to coil winding apparatus and more particularly concerns novel methods and means for continuously winding coils with selectively and displaced taps. In accordance with the inventive concepts, tapped coils are rapidly wound with the taps accurately positioned while minimizing the danger of wire breakage.

Tapped coils are especially useful in a lumped-parameter delay line. Such a delay line advantageously uses a multi-tap coil helically wound on a small diameter cylindrical dielectric coil form. The taps furnish convenient points for connecting small shunt capacitors, and the spacing between taps, which need not be uniform, is determined by a number of engineering design factors, including the desired delay interval. However, once the spacing is specified, it is frequently required that it be maintained quite closely in order to achieve operation within the desired tolerances.

A major problem in winding such coils is the provision of taps. This is typically accomplished by stopping a conventional coil winding machine at each prescribed point, twisting the wire and proceeding to the next tap. These coils are, therefore, relatively expensive, non-uniform, and most significantly, mechanically unreliable as the taps frequently break off during condenser assembly.

The present invention contemplates and has as a primary object the provision of novel methods and means for automatically winding and inserting taps on a coil of this type to achieve accurately spaced taps of greater mechanical strength at higher speed and reduced cost.

Another object of the invention is to employ techniques for winding tapped coils in accordance with the preceding object readily adaptable for automatic production of coils with accurately-spaced, mechanically-strong taps.

According to the invention, a prescribed length of wire from a main wire supply is first wound around an auxiliary spool. One end of the coil form is supported within a chuck having an arm extending radially outward from the axis of the coil form. The auxiliary spool is supported on a short rod at the end of the arm extending parallel to the coil axis toward the other end of the coil. A fixed long rod extends parallel to the coil axis from the latter end for less than the length of the coil form. The auxiliary spool is free to slide along the short rod but normally rests snugly against the arm.

At the start of a winding operation, a taut strand of wire between the auxiliary spool and the main wire supply rests against the coil form at the end supported in the chuck. The chuck, arm and auxiliary spool are rotated about the coil axis, causing wire to unwind from the main wire supply and around the coil form. As the coil is wound, the main wire supply travels in a direction generally parallel to the coil form axis and away from the chuck. The long rod remains stationary.

At a point where a tap is desired, the wire strand from the auxiliary spool to the coil form is moved away from the arm so that it is caught by and wrapped around the long rod as the winding assembly rotates. At the end of a revolution, the strand is again withdrawn to its normal position and the normal winding process continues. The loop formed by the wire strand overlapping the long rod travels in a direction parallel to the axis of the coil form and away from the chuck as the winding assembly rotates.

Other features, objects and advantages of the invention will become apparent from the following specification when read in connection with the accompanying drawing in which.

Figure 1:
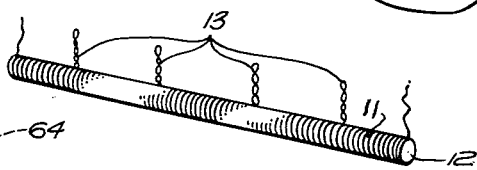
FIG. 1 shows a tapped coil wound according to the invention.

With reference now to the drawing and more particularly FIG. 1 thereof, there is illustrated a tapped coil wound according to the invention. The coil 11 is preferably wound on dielectric coil form 12 with a number of taps 13 which may be spaced uniformly or non-uniformly as desired.

Figure 2:
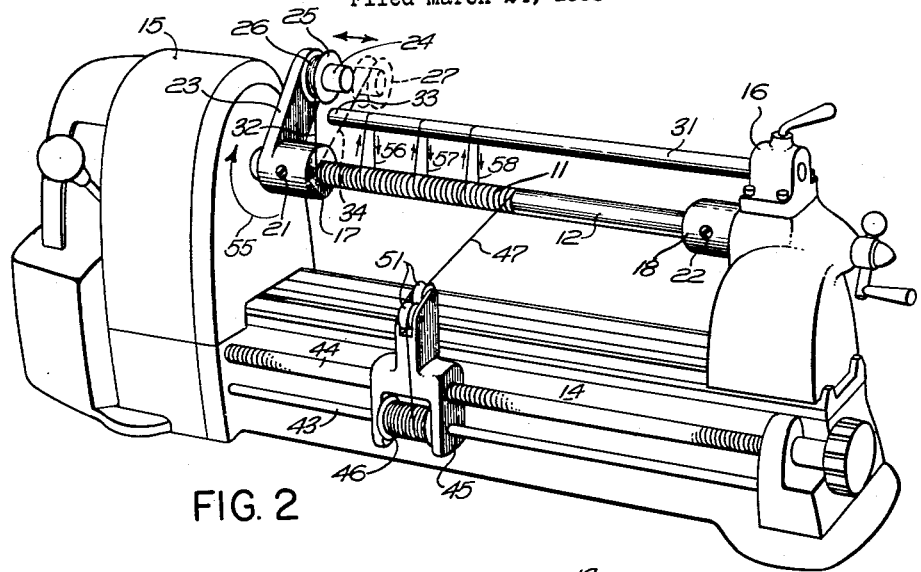
FIG. 2 shows an embodiment of the novel coil winding machine.

With reference to FIG. 2, there is shown an embodiment of the novel coil winding machine, which essentially comprises a conventional lathe specially adapted to perform the functions to be described.

Thus, the machine includes a base 14 supporting headstock 15 and tailstock 16. Chuck 17 and socket 18 are rotatably supported in the respective ends of the machine, and in turn rotatably support coil form 12. With lock screws 21 and 22 tight, chuck 17, coil form 12 and socket 18 rotate in unison.

Chuck 17 carries an arm 23 extending radially outward from the coil form axis. A short rod 24 extends perpendicularly from arm 23 toward the right. Spool 25 carries an auxiliary supply of wire 26 held under tension by an enclosed spring (not shown), preferably a constant force spring, such as a "Neg-ator." Spool 25 is supported on short rod 24 and normally rests flush against arm 23, as illustrated. However, at selected intervals, in order to provide the desired taps, it is moved to the right so that it occupies the position indicated by the broken lines 27. A long highly-polished rod 31 extends from tailstock 16 parallel to the coil form axis almost to the left end of coil form 12. As is clear from the drawing, short rod 24 is further from the coil form axis than long rod 31. With spool 25 in its normal position, wire strand 32 clears the left end 33 of rod 31. When spool 25 is in position 27, wire strand 32 occupies the position 34 and overlaps the end of rod 31.

The entire assembly consisting of chuck 17, arm 23, rod 24, auxiliary spool 25, coil form 12 and socket 18 is rotated when the driving motor (not shown) is energized. A wire supply tension and transport mechanism 45 threadably engages a lead screw 44 and is guided along a lower rod 43. The main wire supply is carried on spool 46 which unwinds about lower rod 43 as the coil is wound. A strand of wire 47 is fed from spool 46 to coil form 12 over pulleys 51. Lead screw 44 is rotated in synchronism with the rotation of coil form 12 by the motor drive.

The machine operates as follows: As chuck 17 rotates in the direction indicated by arrow 55, wire pays out from the main wire supply, spool 46. This wire is helically wrapped about the rotating coil form 12 as the supply moves to the right in synchronism. With strand 32 in the indicated position, rod 31 has no effect on the winding process.

When it is desired to insert a tap, strand 32 is displaced to the right, by hand, or preferably, by moving auxiliary spool 25 to the position indicated by lines 27. Strand 32 is now positioned as indicated by the dotted lines 34 and overlaps rod 31. As chuck 17 continues to rotate, a loop, like loop 56, 57 or 58, is formed about the stationary rod 31. Wire for this loop is payed out from auxiliary spool 25.

At the completion of one revolution (or more if a stronger loop is desired) strand 32 is again displaced to the left so that it clears the left end 33 of rod 31. However, the loop formed on this revolution translates to the right as the coil form continues to rotate. It is to be noted that the specific segment of wire which formed the loop on this revolution is wrapped around the coil form as the loop translates to the right. This is because a segment of wire in the loop, in addition to the translational motion to the right, moves, as indicated by the arrows, about the loop center.

When the desired number of turns are wound, the motor is stopped. Before removing the coil, a coat of Q-max or other coil dope is applied to the side away from the loops forming the taps to prevent loosening of the windings. The loops may then be cut at their center without removing rod 31, cleaned of insulation, and soldered. It is unnecessary to twist the taps tightly as in conventionally-wound lines, thus eliminating a major cause of breakage. For many applications, such as in etched circuits, they need not be twisted at all. Coil form 12 is then removed to provide the finished coil 11 of FIG. 1.

Figure 3:
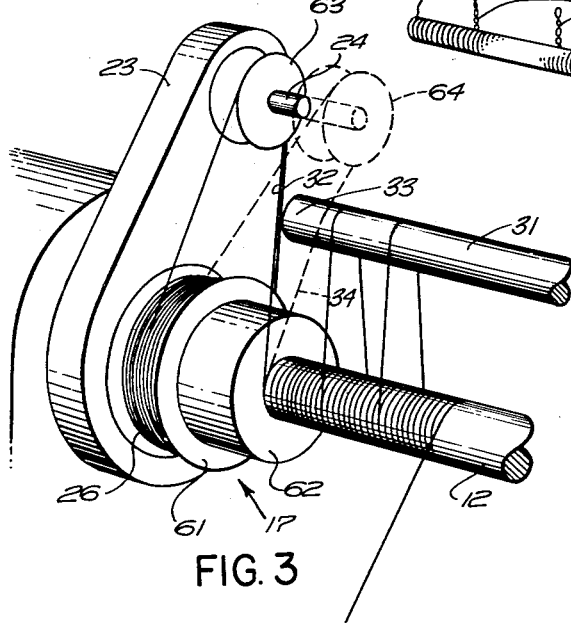
FIG. 3 illustrates an alternative way of storing an auxiliary wire supply.

With reference to FIG. 3, there is illustrated an alternative arrangement for storing the auxiliary wire supply. A spool 61 carries the auxiliary supply of wire 26 on hub 62 of chuck 17. Wire from spool 61 is passed over pulley 63 supported on rod 24 in the same manner as spool 25 of FIG. 2. Strand 32 normally occupies a position to the left of the left end 33 of rod 31 when pulley 63 is flush against arm 23. When pulley 63 is moved to the position 64, strand 32 is again moved to position 34 overlapping long rod 31 to produce the same result described above. It is important to note that any means which will cause strand 32 to overlap rod 31 during one revolution, such as moving rod 31 to the left or manually moving strand 32 to the right, will provide the desired loops.

In an alternate winding procedure, the entire coil may be wound without taps and the wire from spool 46 cut and fastened at the right end, for example, to screw 22. The taps may then be introduced as above, spaced the desired number of turns apart, and allowed to translate to the right until they are within the desired number of turns from the right-hand end of the coil.

It is apparent that the tap-introducing mechanism may be controlled by preset counters, thus making the winding process completely automatic. Moreover, the pitch of the coil may be varied by choosing appropriate lead screws or ratios of pulley 54 diameter to pulley 52 diameter. Numerous other modifications of and departures from the specific techniques disclosed herein may be practiced by those skilled in the art without departing from the inventive concepts. Consequently, the invention is to be construed as limited only by the spirit and scope of the appended claims.

What is claimed is:

1. Apparatus for winding a tapped coil upon a coil form comprising, means for supporting a principal source of continuous wire, means for supporting an auxiliary source containing a portion of said continuous wire, means for unwinding wire from said principal source upon said coil form, and means cooperating with said auxiliary source for forming wire loops constituting taps for said coil.

2. Apparatus in accordance with claim 1 wherein said last mentioned means supports said loops for movement along said coil form during the unwinding of wire from said principal source upon said coil form.

3. In coil winding apparatus having means for winding wire over the surface of a coil form, a supporting base, first and second means rotatably supported by said base for holding said coil form at first and second opposite ends, respectively, a relatively long rod disposed generally parallel to and at a fixed angle about the axis of symmetry of said coil form, said long rod extending from said first end almost to said second end, a rigid member affixed to and extending radially outward from said second means, and a short rod extending perpendicularly from said rigid member toward said first end, the distance between said axis of symmetry and said short rod exceeding that between said axis and said long rod.

4. In a coil winding machine having means for winding wire over the surface of a coil form, a supporting base, first and second means rotatably supported by said base and adapted to secure a generally cylindrical coil form at first and second opposite ends, respectively, a long rod affixed to said base adjacent said first end and extending generally parallel to the axis of said coil form almost to said second end, said second means having a member extending radially outward from said axis, a short rod extending perpendicularly from said member toward said first end at a distance from said axis greater than the distance between said long rod and said axis.

5. Coil winding apparatus in accordance with claim 4 and further comprising a spool slidable along and rotatable about said short rod.

6. Coil winding apparatus in accordance with claim 5 and further comprising, a support rod secured to said base, a rotatable threaded rod supported by said base parallel to said support rod and axis, a wire source tension and transport mechanism slidable along said support rod and threadably engaging said threaded rod, and means for synchronously imparting rotative motion to said threaded rod and said second means.

7. A method of winding a tapped coil upon a coil form having an axis parallel to a smooth rod with a filament having a taut portion at one end of said rod, including the steps of rotating said coil form and said taut portion about the coil form axis while feeding another portion of said continuous filament disposed away from said taut portion about and over the surface of said coil form, and relatively displacing said taut portion and said smooth rod whereby the former overlaps the latter.

References Cited in the file of this patent
UNITED STATES PATENTS

| | | |
|---|---|---|
| 2,401,676 | Weber | June 4, 1946 |
| 2,406,846 | Muller | Sept. 3, 1946 |
| 2,655,717 | Dunn | Oct. 20, 1953 |
| 2,771,664 | Duenke | Nov. 27, 1956 |